United States Patent [19]  [11] 4,049,397
Bockstiegel et al.  [45] Sept. 20, 1977

[54] PROCESS FOR THE PREPARATION OF GRANULATED ABRASIVES FROM FUSED OR SINTERED REFRACTORY INORGANIC HARD SUBSTANCES HAVING A HIGH GRAIN TOUGHNESS

[75] Inventors: Gerd-Edzard Bockstiegel, Troisdorf; Manfred Neidhardt, Siegburg; Gerhard Rehfeld, Aachen; Werner Umlauf, Niederkassel, all of Germany

[73] Assignee: Dynamit Nobel Aktiengesellschaft, Troisdorf, Germany

[21] Appl. No.: 568,642

[22] Filed: Apr. 16, 1975

[30] Foreign Application Priority Data
Apr. 27, 1974 Germany .............................. 2420551

[51] Int. Cl.$^2$ .............................................. C09K 3/14
[52] U.S. Cl. ...................................... 51/309 A; 51/293
[58] Field of Search ................ 51/309, 293, 307, 308, 51/306, 295; 106/65, 57

[56] References Cited

U.S. PATENT DOCUMENTS

| 3,183,071 | 5/1965 | Rue et al. ................................. 51/309 |
| 3,437,468 | 4/1969 | Seufert ..................................... 51/309 |
| 3,491,491 | 1/1970 | Ueltz ........................................ 51/309 |
| 3,607,162 | 9/1971 | Bockstiegel ............................. 51/309 |
| 3,679,383 | 7/1972 | Hack et al. .............................. 51/309 |
| 3,881,282 | 6/1975 | Watson .................................... 51/309 |
| 3,891,408 | 6/1975 | Rowse et al. ........................... 51/309 |

*Primary Examiner*—Donald J. Arnold
*Attorney, Agent, or Firm*—Burgess, Dinklage & Sprung

[57] ABSTRACT

A process for the manufacture of granular abrasives having improved grain toughness from refractory, inorganic hard substances which comprises crushing a lump or block of said refractory inorganic substance, thereafter subjecting the resultant grains to a grind sorting process such that substantially only the porous grains, grains containing flaws or coarsely crystalline grains are comminuted and separating them in the ground condition from the balance of the material.

10 Claims, No Drawings

PROCESS FOR THE PREPARATION OF GRANULATED ABRASIVES FROM FUSED OR SINTERED REFRACTORY INORGANIC HARD SUBSTANCES HAVING A HIGH GRAIN TOUGHNESS

BACKGROUND OF THE INVENTION

1. Field of the Invention

This invention relates to a process for producing granular abrasives having improved grain toughness. More especially, this invention relates to a simple and improved process for obtaining granular abrasives with an improved grain toughness such that they can be used for the grinding of castings, steel ingots and the like.

2. Discussion of the Prior Art

Abrasive grits which are made into grinding bodies, chiefly for the rough grinding of castings, steel ingots or the like, consist mainly of corundum. For some years fused or sintered zirconium corundums have been used preferentially in this field of application, since they are characterized by greater grit toughness and therefore result in greater grinding efficiency.

Grit toughness is on the one hand a characteristic of the material itself, but on the other hand it is also dependent upon the form of the individual grain. Thus, for example, a grain having rounded corners and edges is tougher than a splintery grain. However, pores and voids within a grain reduce its toughness in comparison with the toughness of a compact grain. The crystal structure of the individual grain is also a determining factor in grit toughness. A grain having a coarse crystalline structure is substantially less tough than one having a fine crystalline internal structure.

Grit toughness is known to determine to a considerable extent the resistivity of a grinding wheel. The term "resistivity" in connection with a grinding wheel, as used herein, is to be understood as the weight ratio between the material abraded from the workpiece and the loss of weight from the grinding wheel.

A variety of processes have been proposed for the production of finely crystalline abrasive grits of high grain toughness for use in making grinding bodies of high resistivity.

According to German Pat. No. 1,571,435, the process consists of melting together zirconium oxide and aluminum oxide and/or bauxite, avoiding contact with nitrogen insofar as possible during the casting and solidification of the melt. By this method, abrasive grits of great grain toughness are obtained. A zirconium corundum prepared in this manner not only has fewer pores and voids within the grain, but its structure is decidedly more finely crystalline than that of a zirconium corundum prepared by conventional methods.

In other known processes for the production of finely crystalline abrasive grits of high grain toughness, for manufacture into grinding bodies of high resistivity, a molten mass of the desired composition, consisting of pure aluminum oxide, a mixture of aluminum oxide and chromium oxide, aluminum oxide and titanium oxide, aluminum oxide and zirconium oxide, and possibly other substances or combinations of these substances, is rapidly chilled by pouring it from the crucible. To accelerate cooling a number of methods have been proposed. For example, according to U.S. Pat. No. 1,192,709, rapid cooling can be achieved by pouring the melt into small molds. Other methods are based on controlling the rate of cooling by pouring the melt into molds filled, for example, with iron balls or with cold pieces of the same material.

The processes known hitherto for the production of finely crystalline abrasive grits are encumbered, however, by the disadvantage that abrasive grits produced by such methods contain to some extent large numbers of very fine pores and voids or other flaws, such as tensions in the crystal structure, for example, in spite of a finely crystalline internal structure. Some amounts of coarsely crystalline material can also be found in these grits. Such grits result in a reduction of the grain toughness of the abrasive and hence also of the resistivity of a grinding body.

It has, therefore, become desirable to provide a process for the production of finely crystalline abrasive grits which are free of granular materials containing very fine pores, voids or other flaws and which are substantially free of grains having tensions in the crystal structure. It has become particularly desirable to provide such a process which is not dependent upon avoiding contact of the elements of the melt with nitrogen, nor is it dependent upon the method by which the refractory material is prepared or cooled down from the melt.

SUMMARY OF THE INVENTION

In accordance with this invention, there is provided a process for the manufacture of granular abrasives having improved grain toughness from refractory, inorganic hard substances, which process comprises crushing a lump or block of said refractory, inorganic hard substance, thereafter subjecting the resultant grains to a grind sorting process such that substantially only the porous grains, grains containing flaws or coarsely crystalline grains are comminuted and separating them in the ground condition from the balance of the material.

In accordance with this invention, it has been found that improved abrasives of increased grain toughness can be provided from known refractory materials in lump or block form if the known materials are initially subjected to a crushing process, and thereafter the resultant grains are subjected to a grind sorting process in such a manner that substantially only porous grits, grits containing flaws or coarsely crystalline grits are crushed and are separated from the rest of the material.

By the term "coarsely crystalline grits or grains", as used herein, there are meant those materials whose crystallites are larger than 70 to 80 microns. In the heretofore known processes for the achievement of abrasive grits having a finely crystalline internal structure, grits are generally produced whose crystalline sizes range between 0 and about 120 microns. In accordance with this invention, the process employs a material of such type and by the grind sorting operation, the more easily crushed grains removed, including the coarsely crystalline grains, so that the end product will contain substantially only grains having crystallite sizes smaller than about 70 microns.

In the process of the invention, the grind sorting after treatment can be conducted in a ball mill or tube mill, and it surprisingly results not only in an improvement of the grain shape, but also it destroys the coarsely crystalline grains and the grits of lower grain toughness having flawed structures. Upon separating of these materials, there is provided a final product which is substantially free of these grains of lower toughness containing pores or other flaws.

In the ball or tube milling of the present invention, essentially three functions are accomplished as follows:
1. A rounding of the grains;
2. A comminution of the porous grains and grains containing voids or flaws; and
3. A comminution of the grains having a coarsely crystalline structure.

This leaves behind only those materials having the desired grain shape and having the desired grain toughness, i.e., freedom from flaws or coarsely crystalline structure.

The process of the invention is particularly well suited for improving the grain toughness of granulated, finely crystalline abrasives produced by the melting of aluminum oxide and/or bauxite or by the melting of zirconium oxide and/or baddeleyite with pure aluminum oxide and/or bauxite, the zirconium content amounting to 0 to 60% weight percent, preferably 20 to 45 weight percent. Additional metal oxides can be added, if desired, to the mixtures to be melted, such as chromium oxide or titanium dioxide. These materials are added in subordinate amounts such as, for example, up to approximately 4% by weight. The refractory compositions can contain the common impurities such as $SiO_2$ and $Fe_2O_3$ whose quantity, taken together, should not exceed about 4% by weight.

The process of the invention is useful for the production of abrasives of improved grain structure of other compositions. Thus, other refractory inorganic abrasive grits having a finely crystalline internal structure can also be treated in accordance with the invention. Materials such as the sintered products described in German Auslegeschrift 1,646,483, the disclosure of which is hereby incorporated herein by reference, or sintered corundum or silicon carbide and like are all materials which can be treated in accordance with this invention to provide abrasives of improved grain toughness.

In a particularly preferred embodiment of the invention, the material which is to be treated subsequently in a ball mill is initially subjected to a grain shaping treatment. Grain shaping may be undertaken in a known manner as, for example, by blasting the granulated material in an apparatus provided with one or more baffle plates.

The material which is employed as a raw material for the process is one normally obtained from the melt. It is initially coarsely crushed with the use of jaw crushers or roller crushers, in a known manner. Thereafter, it is further comminuted in a ball mill, for example. Grits are then subjected, if desired, to a grain shaping treatment as described above. After screening out the fines, removing and discarding grits finer than grain size No. 24 in the case of zirconium corundum or corundum, the subsequent grinding, pursuant to the invention, in the ball mill or tube mill is performed.

In the case of corundum or zirconium corundum, it is desirable to process a grit mixture of grain sizes from sieves No. 6 to about sieve No. 24. These grain sizes are those which are in greatest demand in practice for corundum and zirconium corundum abrasive. This is particularly true of zirconium corundum whose zirconium oxide content is 25% by weight, which on the basis of its special toughness and hardness characteristics is used for heavy operations in grain sizes corresponding to grain sizes Nos. 6 to 24.

In the case of abrasive grits made of refractory, inorganic hard substances of other composition, the procedure is similar. The grit fractions other than those named above can be subjected to the ball or tube milling, depending upon their material characteristics and the purpose for which they are to be used. The grinding process can effectively grind to elimination those grains characterized by porosity flaws or by coarse crystalline structures to thereby provide an abrasive material which is characterized by grains of the desired grain contour, which grains are free of porous flaws or coarsely crystalline structure.

In carrying out the process ball mills and tube mills which can be used for the production of abrasive grits are of the type disclosed in Lueger, Vol. 16 (1970), pages 437 to 439, the disclosure of which is hereby incorporated herein by reference.

Grinding bodies of regular geometrical shape are used in accordance with the invention as loose grinding media, preferably spherical grinding bodies. Grinding bodies of a diameter of 10 to 80 mm, preferably 20 to 60 mm, preferably iron balls, have proven suitable in practice. Fundamentally, mixtures of balls of different diameters can also be used. Block shaped grinding bodies can also be employed.

For the attainment of an optimum grain toughness improvement in the input material, it is desirable to initially determine what the optimum conditions are for the length of treatment during the grinding operation. The length of treatment will, of course, depend upon the diameter of the ball mill, the diameter of the balls in the mill, the weight and hardness of the balls in the mill, the speed at which the ball mill is revolved, the weight and grain size makeup of the input material, the grain shape and the grain toughness of the input material.

It should be remembered that it is an object of the invention not to crush all of the material charged into the ball mill or tube mill, but rather to crush and grind all of the materials whose grains are such as to be characterized by having a lesser degree of toughness. Thus, the grinding is for the purpose of separating the unwanted, less tough grains from the desired, tough grains.

DESCRIPTION OF SPECIFIC EMBODIMENTS

In carrying out the process of the invention, a refractory abrasive composition having the following components

| Alumina | 40 to 100% weight percent |
|---|---|
| Zirconia | 0 to 60 % weight percent | and having particle size in the range of 6 to 24 mesh is subjected to ball milling employing a ball mill having a diameter between 80 and 200 cm and having a grinding medium therein of balls whose diameter is between 3 and 8 cm. The ball mill is revolved at a rate of between 8 and 40 r.p.m. The weight of the milling medium is generally between 1.0 and 4.0 that of the weight of the charge and it is ball milled for between 0.5 and 4.0 hours. Under these conditions, the undesired grains are ground and those grains having the desired toughness are retained.

In order to more fully illustrate the invention and the manner of practicing the same, the following examples are set forth. These examples show that good results are achieved when, in the case of a zirconium corundum having a zirconium content of 25% by weight, the material is treated in a tube mill which is 200 cm long and 90 cm in diameter for three hours at 21 r.p.m. with 500 kg of grits and 1000 kg of iron balls of 40 mm diameter in the mill. If larger balls are used, namely iron balls of 80 mm diameter under the same conditions and in the same apparatus as described in Example 1 below, very high bulk weights and very high grain toughnesses are achieved. However, at the same time a very great reduction of grain size of the desired material is realized. On the other hand, if the operation is performed using iron balls of less than 40 mm diameter, it would be uneconomical in view of the great length of time involved.

Throughout this specification and in the examples, grain sizes have been given. The grain size designations given are in accordance with "FEPA-Korngrossenstandard fur Schleifmittelkorn zur Herstellung von Schleifkorpern, Kornungen 8 bis 220", Edition 13 a-D-68. Bulk weights have been determined in accordance with "FEPA-Standard-Methode zur Bestimmung des Schuttgewichtes von Schleifmittelkorn", 1st Edition, 1964.

The grain toughness has been determined by the "Batelle Process", a ball mill testing procedure which is used as a test method in the European abrasive industry. In this procedure a grit called the "nominal grit" is screened out of the abrasive grits and ground in a ball mill under defined conditions until one-third of the material passes through a certain sieve. The number of mill revolutions necessary for this purpose is considered as the index of the grain toughness.

EXAMPLE 1

In an electric arc furnace the following mixture was melted with the addition of charcoal:
750 kg of aluminum oxide (Bayer alumina, 99.5 wt.-% $Al_2O_3$, balance $Na_2O$)
250 kg of zirconium oxide (99.5 wt.-% $ZrO_2$, balance $SiO_2$ and $TiO_2$)
15 kg of reducing charcoal The melt was poured into thick-walled molds. After solidifying the pieces were coarsely crushed in jaw crushers, roll crushers and oscillating crushers (0 to 3 mm) and the grit mixtures were treated for grain shaping by blowing them against a baffle plate. After screening out the fines smaller than sieve No. 24, the mill sorting was performed in a tube mill 200 cm long and 90 cm in diameter at 21 r.p.m., the mill containing 500 kg of grits and 1000 kg of iron balls of 40 mm diameter; the length of the treatment was 3 hours. The material thus treated was separated by known methods into grain sizes from No. 6 to sieve No. 30.

The grain toughness and bulk weight were determined as described above:

| Grain size | Bulk weight | Grit toughness |
|---|---|---|
| No. 8 | 2,340 g/l | 191,000 revolutions |

EXAMPLE 2

Material to be processed in the mill is the same as in Example 1. The mill is charged with 500 kg of grits and 1000 kg of iron balls 60 mm in diameter. Length of treatment: 3 hours

| Grain size | Bulk weight | Grit toughness |
|---|---|---|
| No. 8 | 2,345 g/l | 245,000 revolutions |

Examples 1 and 2 show that the grade can be accurately controlled through the selection of the conditions, while the bulk weight, and hence the grain shape, remain the same.

EXAMPLE FOR COMPARISON

The same raw material mixture as in Examples 1 and 2 was treated in the same manner as described therein, but without the after-treatment in the tube mill in accordance with the invention.

The following values were measured:

| Grain size | Bulk weight | Grain toughness |
|---|---|---|
| No. 8 | 2,215 g/l | 38,000 revolutions |

What is claimed is:
1. A process for preparing an abrasive composition which consists essentially of crushing an alumina block or lump having an alumina content of 40–100% by weight and a zirconium content of 0–60% by weight to obtain a crushed mass; subjecting said mass to a grain shaping treatment by blasting the crushed material in an apparatus having at least one baffle plate; ball milling the crushed mass employing a grinding medium of balls whose diameter is between 3 and 8 cm. while revolving the ball mill at a rate of between 8 and 40 rpm, the weight of the milling medium being between 1.0 and 4.0 that of the weight of the crushed mass while carrying out the ball milling for a period of between 0.5 and 4.0 hours and thereafter separating particles from the so ball milled composition which have a particle size of 8-24 mesh from the balance of the material.

2. A process according to claim 1 wherein the ball milling is carried out in a ball mill having a diameter between 80 and 200 cm.

3. A process according to claim 1 wherein the crushed mass which is subjected to ball milling contains porous granular material, granular material containing flaws or coarsely crystalline granular material.

4. A process according to claim 1 wherein the ball milling is carried out until all of the grains therein have a crystal-like size smaller than 70 microns.

5. A process according to claim 1 wherein said ball milling is performed using bodies which are of regular geometrical shape.

6. A process according to claim 5 wherein said bodies are spherical in shape.

7. A process according to claim 1 wherein said inorganic substance is formed by melting aluminum oxide or bauxite.

8. A process according to claim 1 wherein said inorganic substance is formed by melting aluminum oxide and/or bauxite and zirconium oxide and/or baddeleyite.

9. A process according to claim 8 wherein said inorganic substance contains zirconium oxide in an amount of 10 to 60 weight percent.

10. A process according to claim 9 wherein the zirconium oxide content is 20 to 45 weight percent.

* * * * *

UNITED STATES PATENT AND TRADEMARK OFFICE
CERTIFICATE OF CORRECTION

PATENT NO. : 4,049,397
DATED : September 20, 1977
INVENTOR(S) : Gerd-Edzard Bockstiegel et al It is certified that error appears in the above-identified patent and that said Letters Patent are hereby corrected as shown below:

Column 5, line 51, after "from" insert -- grit --.

Column 5, line 51, delete "sieve" insert -- grit --.

Column 5, line 57, before "No. 8" insert -- grit --.

Column 6, line 3, before "No. 8" insert -- grit --.

Column 6, line 19, before "No. 8" insert -- grit --.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks